United States Patent
Dunda

(10) Patent No.: US 10,406,616 B2
(45) Date of Patent: Sep. 10, 2019

(54) METHOD FOR SHARPENING SAW BLADES FOR VIBRATORY OR OSCILLATORY CUTTING TOOLS

(71) Applicant: Gregory Dunda, Roanoke, VA (US)

(72) Inventor: Gregory Dunda, Roanoke, VA (US)

(*) Notice: Subject to any disclaimer, the term of this patent is extended or adjusted under 35 U.S.C. 154(b) by 0 days.

(21) Appl. No.: 15/457,352

(22) Filed: Mar. 13, 2017

(65) Prior Publication Data

US 2017/0182571 A1    Jun. 29, 2017

Related U.S. Application Data

(63) Continuation-in-part of application No. 14/724,588, filed on May 28, 2015, now abandoned.

(60) Provisional application No. 62/004,530, filed on May 29, 2014.

(51) Int. Cl.
| | | |
|---|---|---|
| *B23D 63/12* | (2006.01) | |
| *B24B 3/36* | (2006.01) | |
| *B24D 5/06* | (2006.01) | |
| *B24B 23/02* | (2006.01) | |

(52) U.S. Cl.
CPC ............ *B23D 63/123* (2013.01); *B24B 3/361* (2013.01); *B24B 23/02* (2013.01); *B24D 5/066* (2013.01)

(58) Field of Classification Search
CPC ....... B23D 63/123; B24B 23/02; B24B 3/361; B24D 5/066
See application file for complete search history.

(56) References Cited

U.S. PATENT DOCUMENTS

| | | | | |
|---|---|---|---|---|
| 1,045,016 A | * | 11/1912 | George et al. ............ | B24D 5/12 125/37 |
| 2,144,987 A | * | 1/1939 | Miller ..................... | B24B 3/602 451/48 |
| 4,151,685 A | * | 5/1979 | Frangipane ............ | B24D 18/00 451/544 |
| 5,392,758 A | * | 2/1995 | Rognon ............... | B23D 47/005 125/13.01 |

FOREIGN PATENT DOCUMENTS

GB         687708 A  *  2/1953  ........... B23D 63/123

OTHER PUBLICATIONS

Dremel MM422 Wood-Metal Flush Cut Blade detail sheet (commercial product available Aug. 1, 2013).*
Isakower—Nov. 1978—Design Charts for Torsional Properties of Non-circular Shafts.*

* cited by examiner

*Primary Examiner* — Marc Carlson

(57) ABSTRACT

A sharpening device for cost-effectively sharpening dulled saw blades and a method of making and using the same is provided. The sharpening device may form a tooth-like configuration adapted to rotatably grind and sharpen a saw-teeth configuration into a saw blade. The tooth-like configuration may be provided by a plurality of grinding discs and spaces alternatively stacked in a stacked configuration along an arbor that can engage a hand-held power tool. The stack configuration may be retained on the arbor through various stop mechanisms, such as a built-up section or a collar with a set screw. To prevent the stacked configuration from spinning on the arbor from torque transmission, a key way design utilizing a groove cut along the arbor and a complementary arbor hole notch may be employed. Alternatively, the arbor hole may have a shape that matches and mates with the shape of the arbor.

15 Claims, 5 Drawing Sheets

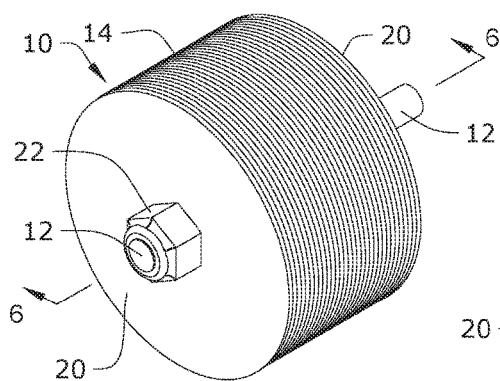
FIG.3
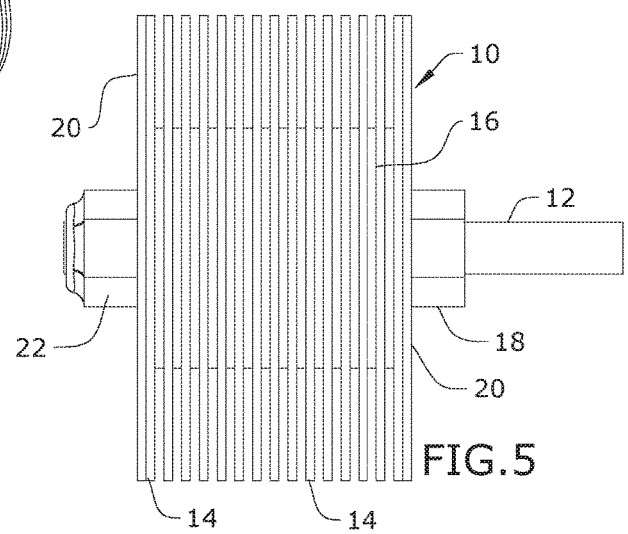
FIG.5
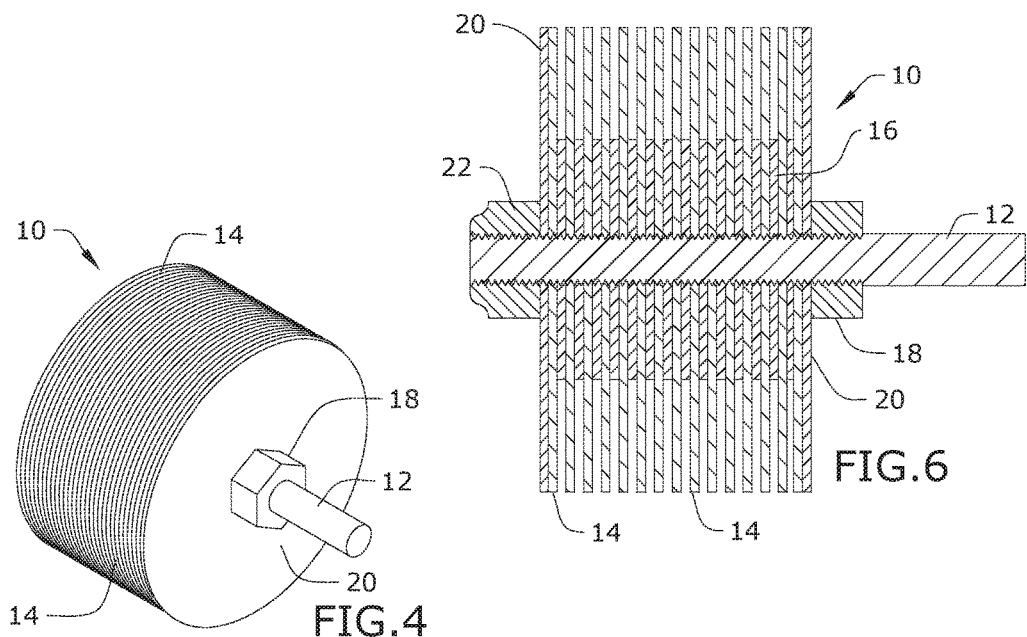
FIG.4
FIG.6

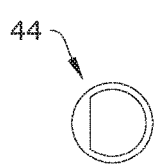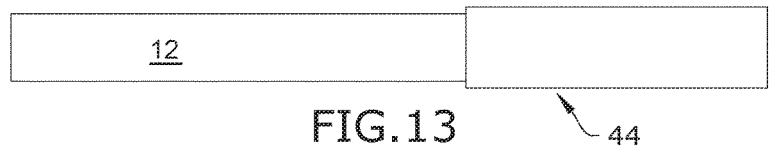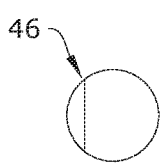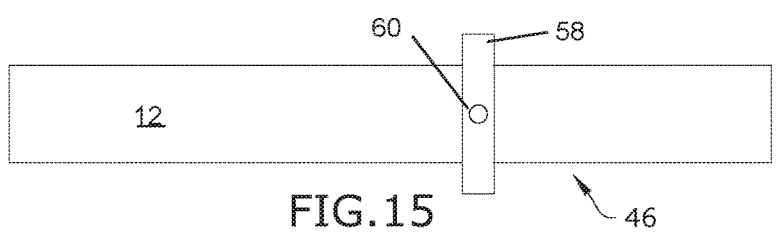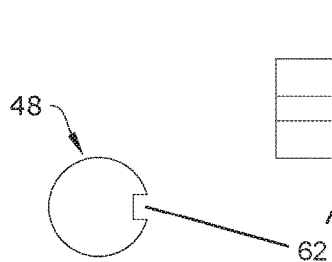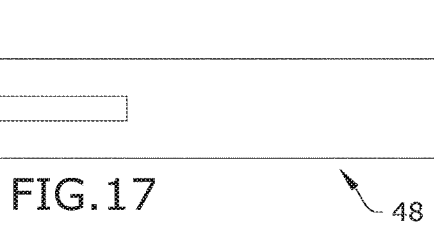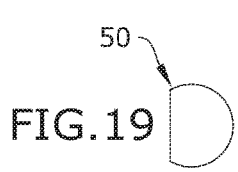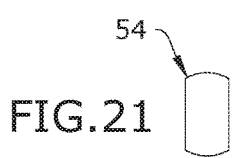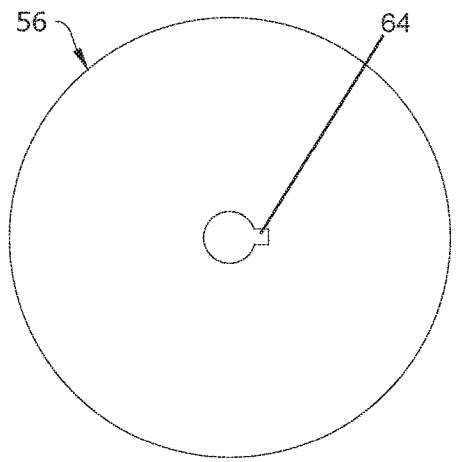

METHOD FOR SHARPENING SAW BLADES FOR VIBRATORY OR OSCILLATORY CUTTING TOOLS

CROSS-REFERENCE TO RELATED APPLICATION

This application claims the benefit of priority of U.S. provisional application No. 62/004,530, filed 29 May 2014, the content of which are herein incorporated by reference.

BACKGROUND OF THE INVENTION

The present invention relates to improvement in saw blades and, more particularly, to a method for proficiently and cost-effectively sharpening dulled saw blades as applicable to hand-held vibratory or oscillatory cutting tools. These vibratory and oscillatory saw blades, due to normal cutting requirements concerning various materials, tend to wear out quickly and thus require regular replacement as applicable. Under current conditions applicable to the hand-held power tool space, there is a marked absence of a practical method of sharpening dulled oscillatory saw blades, thus making continuing replacement of these dulled blades an expensive proposition to the every-day layperson. In view of these less-than-ideal market conditions, there is a need for a method for proficiently and cost-effectively sharpening dulled vibratory and oscillatory saw blades.

SUMMARY OF THE INVENTION

In one aspect of the present invention, a method of sharpening a peripheral sawtooth edge of preformed dull oscillatory or vibratory saw blades is provided. As directed to hand-held vibratory or oscillatory cutting tools, these saw blades are sharpened by a method in which a plurality of stacked grinding discs are first configured in mechanical connection with a power tool such as a hand-held drill. Once configured in this manner, the peripheral edge of a planar oscillatory saw blade is brought into perpendicular contact with the plurality of stacked grinding discs to initiate sharpening of the dulled cutting blade. More particularly, for a more proficient sharpening method, the plurality of stacked grinding discs is configured with a linear profile corresponding to the linear sawtooth pattern of the planar vibratory or oscillatory saw blade to be sharpened. Applicable sharpening of the dulled oscillatory saw blade is accomplished by utilizing the power tool to rotate said plurality of stacked grinding discs, thereby sharpening the sawtooth pattern of the peripheral edge of the saw blade in contact with the plurality of grinding discs.

Another aspect of the inventive blade sharpening method claimed includes bringing a peripheral edge of a planar vibratory or oscillatory saw blade into perpendicular contact with the plurality of rotating grinding discs wherein each uppermost point of the grinding discs rotates in a safe direction away from the peripheral edge of the planar saw blade.

While sharpening of planar vibratory or oscillatory saw blades consistent with the invention may be supported by any practical means of mechanically securing such planar blade designs, such as by utilizing a bench vice, proficient sharpening of these saw blades may preferably be performed with an individual blade remaining secured to the hand-held vibratory or oscillatory cutting tool which the blade is directly attached for cutting a wide range of materials as applicable. Sharpening of a dulled vibratory or oscillatory saw blade in this manner thus enables a side-to-side pivoting of the peripheral edge of the saw blade against the plurality of rotating grinding disks to define a sawtooth profile comprising individual teeth of an angular orientation.

Other aspects of the present invention are directed to a method of providing a device for sharpening the peripheral sawtooth edge of pre-formed dulled vibratory or oscillatory saw blades. In one aspect of the present invention, a method of sharpening the peripheral sawtooth edge of pre-formed dulled vibratory or oscillatory saw blades comprises providing an arbor extending from a first proximal portion to a second distal portion, wherein said first proximal portion is configured with a smooth cylindrical surface and said second distal portion is configured with helical screw threads. In another aspect of the inventive device, a plurality of grinding discs and a plurality of spacers are disposed along the second distal portion of the arbor, wherein said spacers are disposed beside and between adjacent grinding discs to form a uniform configuration of stacked grinding discs. Further, each of the plurality of grinding discs and spacers of the inventive device are configured to provide a linear stacked profile corresponding to linear sawtooth patterns of oscillatory saw blades.

The inventive method of sharpening the peripheral sawtooth edge of pre-formed dulled vibratory or oscillatory saw blades further comprises providing a threaded nut stop mechanism, a first and a second fender washer, a first and a second protective plate, and a threaded lock nut fastening mechanism, wherein the first and second fender washers and the first and second protective plates are each disposed along the threaded portion of the arbor between the threaded nut stop mechanism and the threaded lock nut fastening mechanism, said first and second protective plates further being positioned against two outermost spacers adjacent to the plurality of grinding discs and in between the fender washers.

The inventive method of sharpening the peripheral sawtooth edge of pre-formed dulled vibratory or oscillatory saw blades further comprises causing that the threaded nut stop mechanism and the threaded lock nut fastening mechanism of the inventive device are each disposed and secured along the second distal portion of the arbor via screwing each nut onto and along the threaded portion of the arbor. In this case, such screwing of the threaded lock nut fastening mechanism thereby provides a mechanical distribution of compressive force upon the first and second fender washers, the first and second protective plates, the plurality of grinding discs, and the plurality of spacers to tighten and secure the grinding discs against the threaded nut stop mechanism of the arbor.

The oscillatory saw blade sharpening device of the invention further provides that the first proximal portion of the arbor is configured to rotatably mount to a hand-held power tool such as, preferably, a cordless drill. Other hand-held power tools that are practicable to utilizing devices or sharpening methods consistent with the current invention, whether configured as a corded or a cordless tool design, may include powered drivers, hammer drills, angle drills, impact drivers, or other drive tools as may prove viable.

In another aspect of the present invention, a method of sharpening the peripheral sawtooth edge of pre-formed dulled vibratory or oscillatory saw blades comprises providing an arbor extending from a first proximal portion to a second distal portion, wherein the first proximal portion is configured with a diameter larger than the second distal portion and said second distal portion is configured with a D-shaped profile extending longitudinally and terminating with helical screw threads.

These and other aspects, features, and advantages of the present invention will become better understood with reference to the following drawings, description, and claims.

BRIEF DESCRIPTION OF THE DRAWINGS

FIG. 3 is a perspective view of an exemplary embodiment of the present invention;

FIG. 4 is a reverse perspective view of an exemplary embodiment of the present invention;

FIG. 5 is a side view of an exemplary embodiment of the present invention;

FIG. 6 is a section view of an exemplary embodiment of the present invention, taken along line 6-6 in FIG. 3;

FIG. 13 is a side view of an exemplary embodiment of the present invention;

FIG. 14 is a front view of an exemplary embodiment of the present invention;

FIG. 15 is a side view of an exemplary embodiment of the present invention;

FIG. 16 is a front view of an exemplary embodiment of the present invention;

FIG. 17 is a side view of an exemplary embodiment of the present invention;

FIG. 18 is a front view of an exemplary embodiment of the present invention;

FIG. 19 is a front view of an exemplary embodiment of the present invention;

FIG. 20 is a front view of an exemplary embodiment of the present invention;

FIG. 21 is a front view of an exemplary embodiment of the present invention; and FIG. 22 is a front view of an exemplary embodiment of the present invention.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a method of sharpening a peripheral sawtooth edge of preformed dull oscillatory or vibratory saw blades. Another embodiment of the invention comprises a method of providing a sharpening device to sharpen a peripheral sawtooth edge of preformed dull oscillatory or vibratory saw blades.

The sharpening device which is provided in the method of the invention forms a tooth-like configuration adapted to rotatably grind and sharpen a pre-formed saw-teeth configuration of a dull oscillatory or vibratory saw blade.

Referring to FIGS. 1 through 7, a saw blade 26 of a vibratory or oscillating saw 24 typically provides a thin blade of steel forming a saw-teeth configuration 30 along its peripheral edge 28. From time to time, the saw-teeth configuration 30 becomes worn-down and in need of sharpening.

Figure 1:
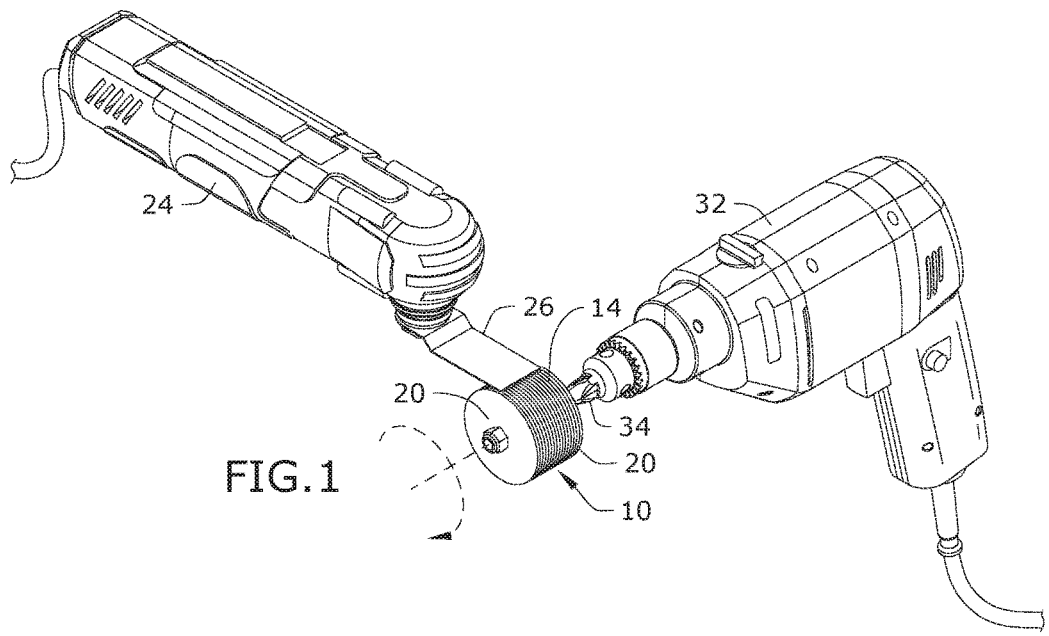
FIG. 1 is a perspective view of an exemplary embodiment of the present invention, shown in use.
Figure 2:
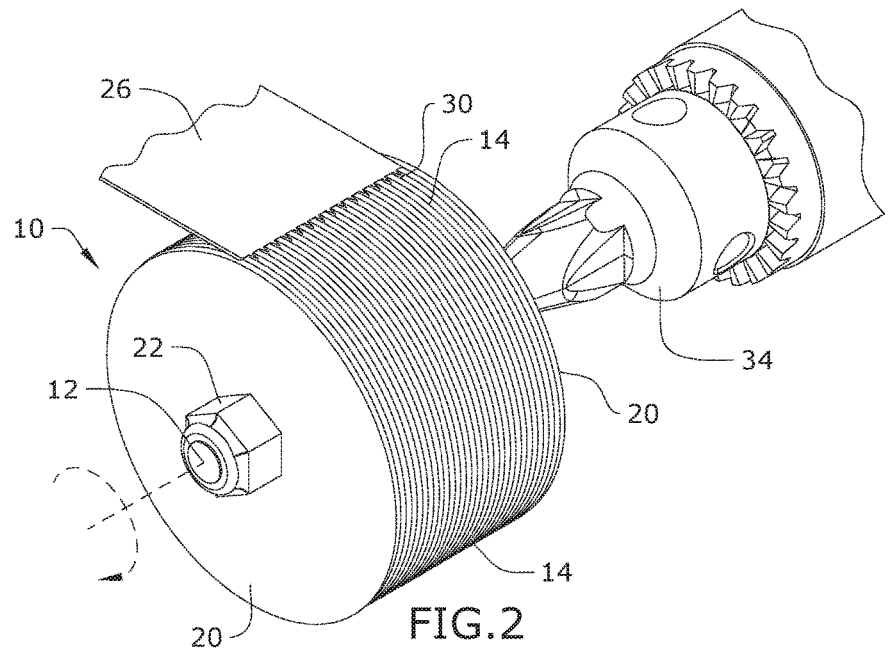
FIG. 2 is a perspective detail view of an exemplary embodiment of the present invention, shown in use.
Figure 7:
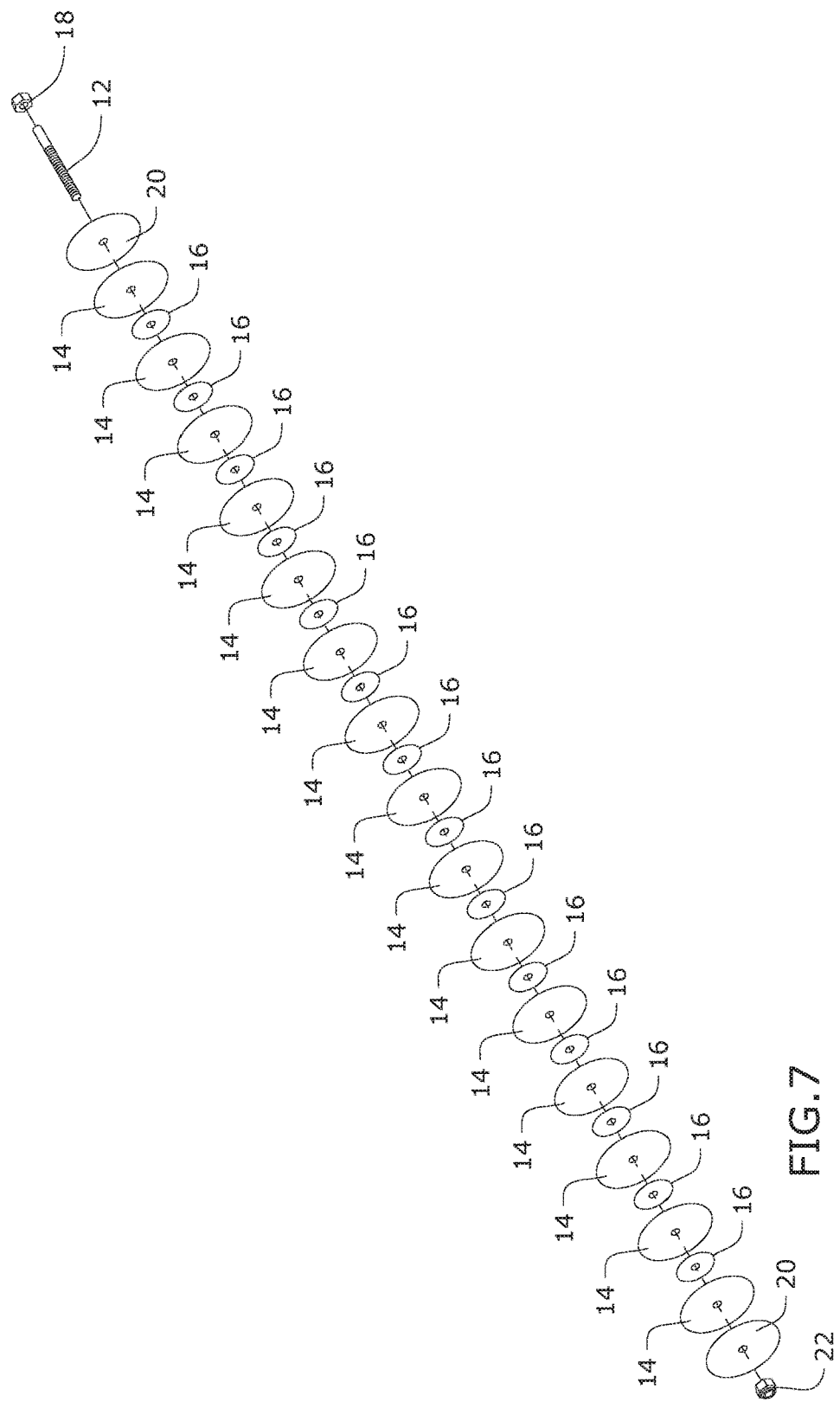
FIG. 7 is an exploded view of an exemplary embodiment of the present invention, shown in use.
Figure 8:
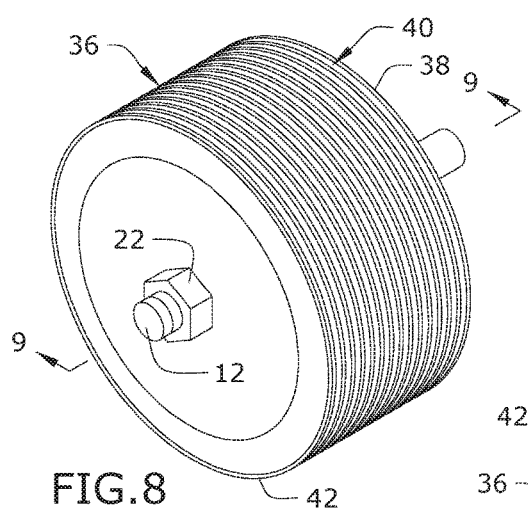
FIG. 8 is a perspective view of an exemplary embodiment of the present invention.
Figure 9:
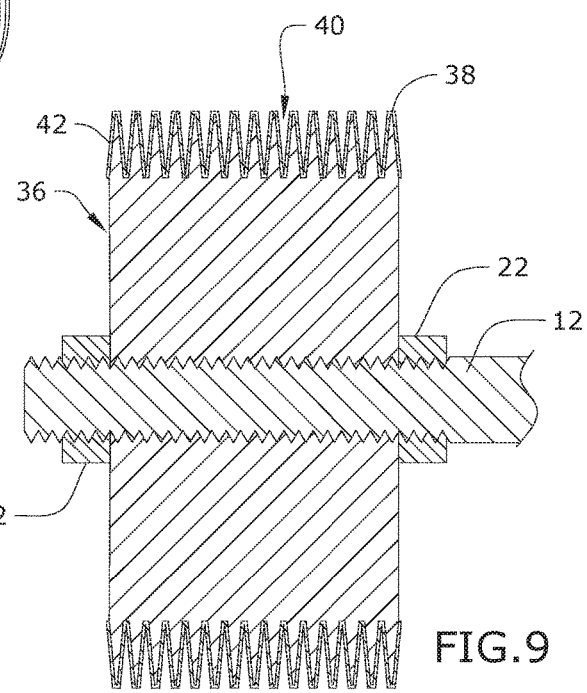
FIG. 9 is a section view of an exemplary embodiment of the present invention, taken along line 9-9 in FIG. 8.
Figure 10:
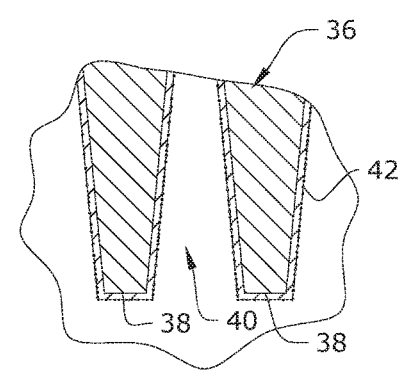
FIG. 10 is a detail section view of an exemplary embodiment of the present invention.
Figure 11:
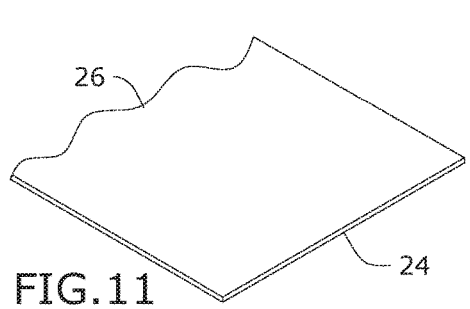
FIG. 11 is a perspective view of an exemplary embodiment of a saw blade in a dulled configuration.
Figure 12:
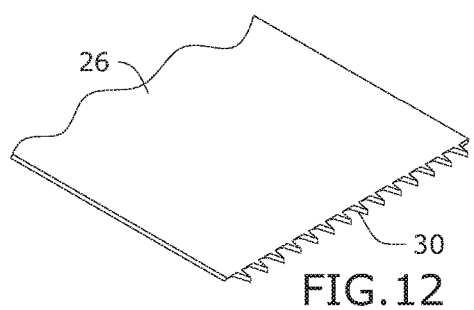
FIG. 12 is a side view of an exemplary embodiment of the saw blade in a sharpened configuration.

The sharpening device 10 may include an arbor 12, a plurality of grinding discs 14 and a plurality of spacers 16. Each spacer 16 and grinding disc 14 may form an arbor hole dimensioned and adapted for snugly receiving the arbor 12 through the plurality thereof. The plurality of grinding discs 14 may be evenly spaced along the arbor 12 by the plurality of spacers 16 disposed between each adjacent grinding disc 14, as illustrated in FIGS. 5 through 7, so as to form a series of sharpening ridges divided by valleys, providing a tooth-like configuration. Each grinding disc 14 may be generally circular so that the tooth-like configuration forms a cylindrical profile.

Each grinding disc 14 may be made of cutting stone, metal or another sufficiently strong material so as to function in accordance with the present invention as described herein. Each spacer 16 may be made of rubber or other material that is sufficiently resilient and durable so as to function in accordance with the present invention as described herein.

A threaded surface may be disposed along a portion of the arbor 12, typically along a threaded portion so as to define a non-threaded portion, as illustrated in FIG. 6. The present invention may include a nut fastener 18, a fastener 22, and a pair of protective plates 20. Each protective plate 20 and the fastener 18 and 22 may form an arbor hole dimensioned and adapted to snugly receive the threaded portion of the arbor 12.

Each protective plate 20 may be disposed so as to bookend one of the two opposing ends of the evenly spaced plurality of grinding discs 14, thereby sandwiching the plurality of discs 14 and spacers 16. Each protective plate 20 may be dimensioned and adapted to protect the plurality of grinding discs 14 from breaking if the sharpening device 10 is banged or dropped. The nut fastener 18 and the washer fastener 22 may be disposed so as to bookend the opposing protective plates 20, securely engaging the plurality of grinding discs 14 to the arbor 12. Thus the pair of threaded fasteners 18 and 22 (or two 22s) may be disposed and secured along the threaded portion of the arbor 12 so as to sandwich the plurality of grinding discs 14.

It should be understood, of course, that the foregoing relates to exemplary embodiments of the invention and that modifications may be made without departing from the spirit and scope of the invention as set forth in the following claims.

What is claimed is:

1. A method for sharpening dulled saw teeth of a preformed vibratory or oscillatory saw blade, the method comprising:

providing a sharpening device comprising a plurality of grinding discs concentrically mounted on an arbor and arranged to form a cylindrical grinding profile that substantially matches a linear profile of the dulled saw teeth;

connecting the arbor of the sharpening device to a rotary power tool;

aligning the linear profile of the dulled saw teeth with the cylindrical grinding profile of the sharpening device;

holding the pre-formed vibratory or oscillatory saw blade in contact with the sharpening device to engage the plurality of grinding discs with the dulled saw teeth;

rotating the arbor of the sharpening device to reform and sharpen the dulled saw teeth.

2. The method according to claim 1, wherein the contact in the holding the pre-formed vibratory or oscillatory saw blade in contact with the sharpening device to engage the plurality of grinding discs with the dulled saw teeth is tangential contact.

3. The method according to claim 1, wherein the pre-formed vibratory or oscillatory saw blade is mechanically secured to a vibratory or oscillatory cutting tool during the method for sharpening.

4. The method according to claim 1, wherein the arbor comprises a proximal portion and a distal portion separated by a stop, the proximal portion configured to connect to the rotary power tool, and the distal portion comprising a threaded portion.

5. The method according to claim 4, wherein the plurality of grinding discs are mounted on the distal portion of the arbor.

6. The method according to claim 5, wherein the plurality of grinding discs mounted on the arbor are spaced apart by a plurality of spacer discs mounted on the arbor beside and between adjacent grinding discs to form a stack of alternating grinding discs and spacer discs bookended with outermost grinding discs.

7. The method according to claim 6, wherein each of the plurality of grinding discs comprise an arbor receiving hole through the center of the each of the plurality of grinding discs for mounting on the arbor.

8. The method according to claim 7, wherein the arbor receiving hole is formed in a shape selected from the group comprising: circular-shape, D-shape, double D-shape, square-shape, or circular with notch shape.

9. The method according to claim 8, wherein the arbor has a cross sectional shape that is shaped to substantially match the shape of the coaxial arbor receiving hole and is sized to closely fit inside the coaxial arbor receiving hole.

10. The method according to claim 9, wherein the stack is bookended with a pair of protective plates adjacent to the outermost grinding discs.

11. The method according to claim 10, wherein the stack and the protective plates are mounted on the arbor by compression between a threaded fastener on a distal end of the arbor and the stop.

12. The method according to claim 11, wherein the stop is selected from the group comprising: a diametric step in the arbor, a hex nut, a collar, or combination thereof.

13. The method according to claim 12, wherein the contact in the holding the pre-formed vibratory or oscillatory saw blade in contact with the sharpening device to engage the plurality of grinding discs with the dulled saw teeth is tangential contact.

14. The method according to claim 12, wherein the pre-formed vibratory or oscillatory saw blade is mechanically secured to a vibratory or oscillatory cutting tool during the method for sharpening.

15. The method according to claim 13, wherein the pre-formed vibratory or oscillatory saw blade is mechanically secured to a vibratory or oscillatory cutting tool during the method for sharpening.

* * * * *